United States Patent
Ismail et al.

(10) Patent No.: US 11,582,960 B2
(45) Date of Patent: Feb. 21, 2023

(54) DUAL-BEARING REEL

(71) Applicant: SHIMANO COMPONENTS (MALAYSIA) SDN. BHD., Johor (MY)

(72) Inventors: Mohd Syamsul Johary Bin Ismail, Johor (MY); Abu Supian Bin Ahmad, Johor (MY); Muhammad Zaidi Bin Bachok Beduwi, Johor (MY); Baihaki Bin Sabtu, Johor (MY); Muhammad Aliff Nazreen Bin Norazmi, Johor (MY); Muhd Syukri Nazry Bin Mustapha, Johor (MY)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 17/563,315

(22) Filed: Dec. 28, 2021

(65) Prior Publication Data
US 2022/0217959 A1 Jul. 14, 2022

(30) Foreign Application Priority Data
Jan. 14, 2021 (JP) .............................. JP2021-004010

(51) Int. Cl.
*A01K 89/01* (2006.01)
*A01K 89/015* (2006.01)

(52) U.S. Cl.
CPC .... *A01K 89/0193* (2015.05); *A01K 89/01931* (2015.05)

(58) Field of Classification Search
CPC ............ A01K 89/0186; A01K 89/0189; A01K 89/01929; A01K 89/01928; A01K 89/01931
See application file for complete search history.

(56) References Cited

U.S. PATENT DOCUMENTS

2019/0191682 A1* 6/2019 Oogose .............. A01K 89/0189

FOREIGN PATENT DOCUMENTS

| JP | 2018-7578 A | 1/2018 |
| JP | 6467218 B2 | 2/2019 |

* cited by examiner

*Primary Examiner* — Emmanuel M Marcelo
(74) *Attorney, Agent, or Firm* — Global IP Counselors, LLP

(57) ABSTRACT

A dual-bearing reel includes a reel body, a spool shaft, a first elastic member, a first shaft bearing, a pinion gear, a pressing member, and a second elastic member. The first elastic member is mounted on the outer circumferential surface of the spool shaft. The first shaft bearing includes an inner race that has an inner circumferential surface that contacts the first elastic member, and an outer race. The pressing member is pressed by the pinion gear in a first direction and approaches a first end when the pinion gear is in the decoupled position. The second elastic member is disposed between the pressing member and the outer race of the first shaft bearing, and the pressing member is pressed by the pinion gear when the pinion gear is in the decoupled position, thereby pressing the outer race of the first shaft bearing in the first direction.

5 Claims, 4 Drawing Sheets

DUAL-BEARING REEL

CROSS-REFERENCE TO RELATED APPLICATIONS

This application claims priority to Japanese Patent Application No. 2021-004010, filed on Jan. 14, 2021. The entire disclosure of Japanese Patent Application No. 2021-004010 is hereby incorporated herein by reference.

BACKGROUND

Field of the Invention

The present invention relates to a dual-bearing reel.

Background Art

A conventional dual-bearing reel can include a spool shaft supported by a reel body. For example, in the dual-bearing reel of Japanese published unexamined application 2018-007578 Official Notice, each end of the spool shaft is rotatably supported by the reel body via shaft bearings. The shaft bearing has an inner race, an outer race, and a plurality of rolling elements. Internal gaps are provided around the plurality of rolling elements.

SUMMARY

In the dual-bearing reel of Japanese published unexamined application 2018-007578 Official Notice, during casting the spool shaft rotates at a high speed. It has been determined that when the spool shaft rotates at a high speed there is the risk that vibrations or knocking noises will occur due to the internal gaps provided in the shaft bearing. In order to solve this problem, in the dual-bearing reel of Japanese Patent No. 6467218, the inner race is biased so as to close the internal gaps of the shaft bearing. However, it has been found that in the dual-bearing reel of Japanese Patent No. 6467218, a stroke is required for moving the pinion gear in the spool shaft direction as the clutch is engaged/disengaged; thus, there is no space to provide a biasing mechanism in the shaft bearing that supports the spool shaft axially outwardly from the tip of the pinion gear. In addition, the biasing force may convert to rotational resistance of the pinion gear during winding; thus, there is room for improvement.

An object of embodiments of the present invention is to suppress the generation of vibrations and knocking noises of the shaft bearing that supports the spool shaft axially outwardly from the tip of the pinion gear during casting.

A dual-bearing reel according to an embodiment of the present invention comprises a reel body, a spool shaft, a first elastic member, a first shaft bearing, a pinion gear, a pressing member, and a second elastic member. The spool shaft is rotatably supported by the reel body. The spool shaft has a first end, and a second end opposite the first end. The first elastic member is mounted on an outer circumferential surface of the spool shaft. The first shaft bearing is disposed in the reel body and rotatably supports the first end of the spool shaft. The first shaft bearing includes an inner race that has an inner circumferential surface that contacts the first elastic member, an outer race, and a plurality of rolling elements disposed between the inner race and the outer race. The pinion gear can move, in a first direction approaching a first end of the spool shaft and a second direction opposite the first direction, between a coupled position in which the pinion gear is connected to the spool shaft so as to be integrally rotatable, and a decoupled position in which the connection with the spool shaft is released. The pressing member is pressed in the first direction by the pinion gear when the pinion gear is in the decoupled position. The second elastic member is disposed between the pressing member and the outer race of the first shaft bearing, and the pressing member is pressed by the pinion gear when the pinion gear is in the decoupled position, thereby pressing the outer race of the first shaft bearing in the first direction.

In this embodiment of a dual-bearing reel, the outer race of the first shaft bearing is pressed in the first direction by the pinion gear via the pressing member and the second elastic member when the pinion gear is in the decoupled position. In addition, the first elastic member is in contact with the outer circumferential surface of the spool shaft and the inner circumferential surface of the inner race of the first shaft bearing. Therefore, when the outer race of the first shaft bearing is pressed in the first direction by the pinion gear via the pressing member and the second elastic member, the outer race of the first shaft bearing moves in the axial direction relative to the inner race of the first shaft bearing. As a result, when the pinion gear is in the decoupled position, the internal gap of the first shaft bearing in the axial direction is reduced. As a result, it is possible to suppress the generation of vibrations and knocking noises of the shaft bearing that supports the spool shaft during casting. In addition, the loosening of the inner race in the axial direction can be suppressed with the first elastic member.

The pressing of the pressing member in the first direction by the pinion gear can be released when the pinion gear is in the coupled position. In this embodiment, it is possible to prevent the pressing member from acting as rotational resistance to the pinion gear during line winding.

The dual-bearing reel can further comprise a second shaft bearing that is disposed in the reel body and that rotatably supports the pinion gear. The pressing member can be disposed between the first shaft bearing and the second shaft bearing, contacting the second shaft bearing when the pinion gear is in the coupled position, and separating from the second shaft bearing when the pinion gear is in the decoupled position. In this embodiment, it is possible to cause the pressing member to function as a spacer that fills the gap between the first shaft bearing and the second shaft bearing in the axial direction. In addition, the second elastic member can suppress vibrations of the first shaft bearing and the second shaft bearing.

The first elastic member can be disposed on the first direction side of the center of the plurality of rolling elements in the axial direction of the spool shaft. In this embodiment, because the first elastic member is arranged in a position farther away from the second elastic member in the axial direction, when the outer race of the first shaft bearing is pressed by the pressing member via the elastic member, the second elastic member can effectively impart resistance in the axial direction to the inner race of the first shaft bearing.

The first elastic member and the second elastic member can be O-rings. In this embodiment, it is possible to suppress the generation of vibrations and knocking noises of the shaft bearing that supports the spool shaft with a simple configuration.

By the present invention, it is possible to suppress the generation of vibrations and knocking noises of the shaft bearing that supports the spool shaft axially outwardly from the tip of the pinion gear at during casting.

DETAILED DESCRIPTION OF EMBODIMENTS

Figure 1:
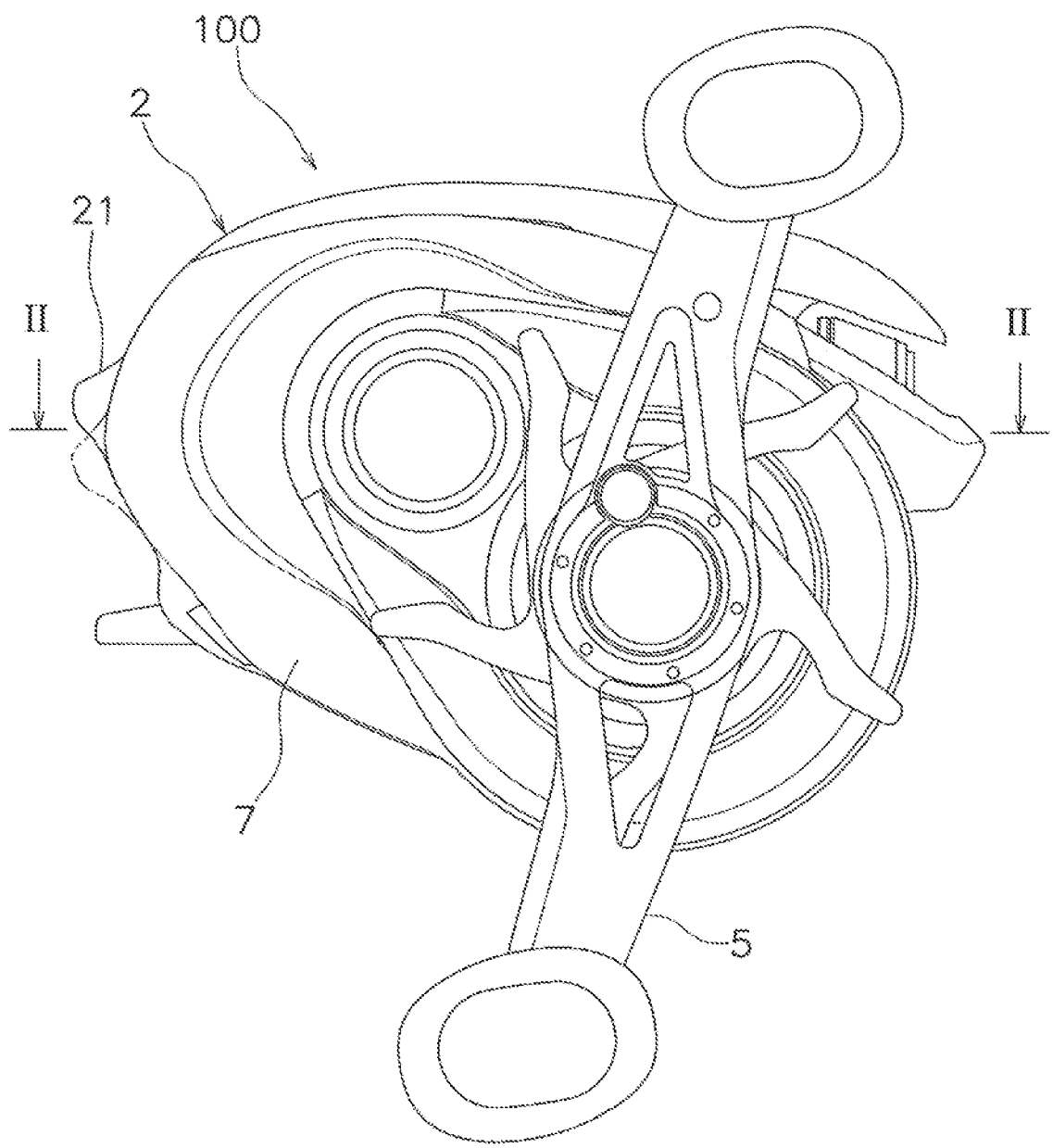
FIG. 1 is a side view of a dual-bearing reel.
Figure 2:
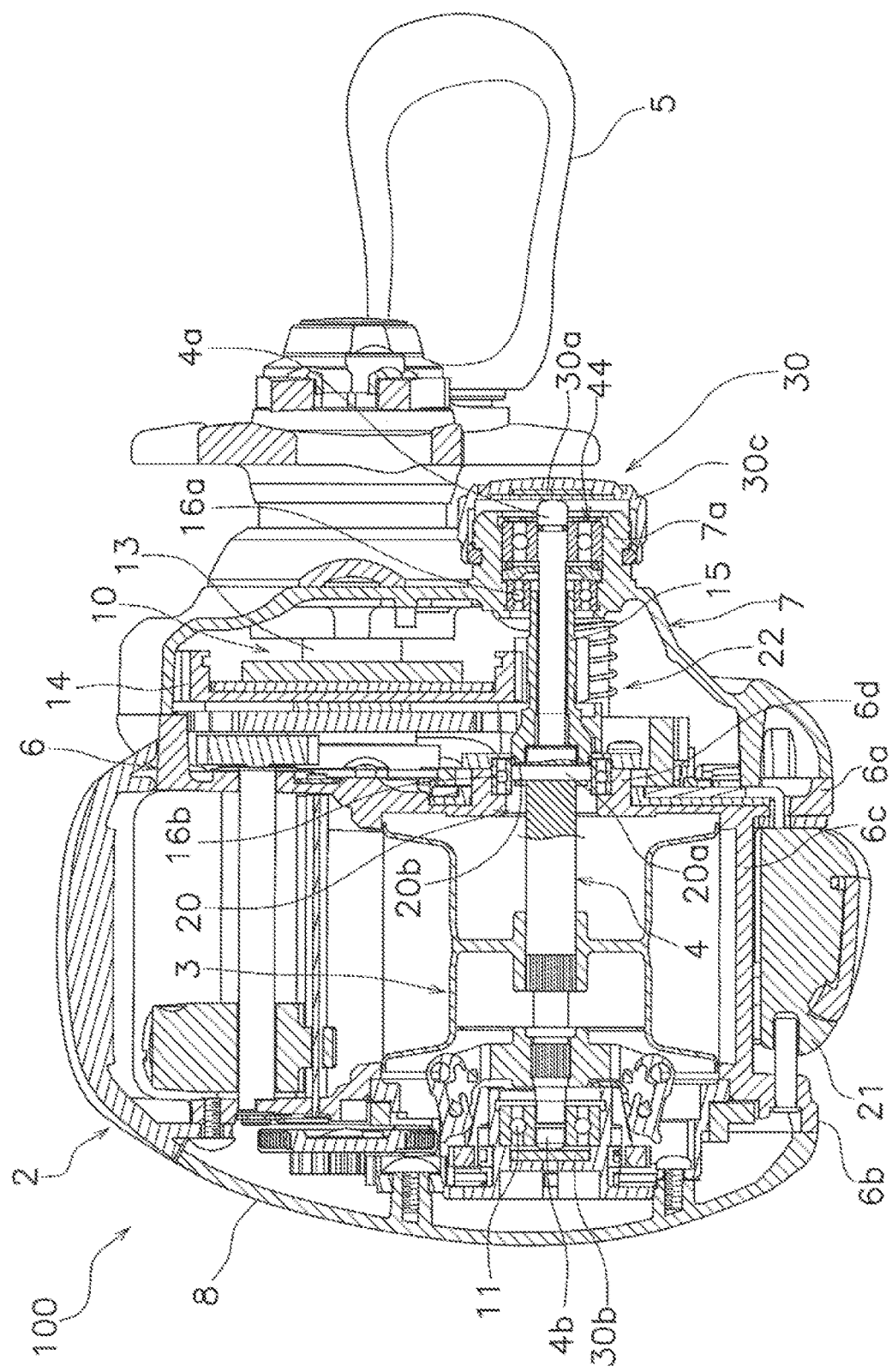
FIG. 2 shows a cross section through line II-II in FIG. 1.

As shown in FIGS. 1 and 2, a dual-bearing reel 100 in which one embodiment of the present invention is employed comprises a reel body 2, a spool 3, a spool shaft 4, a handle 5, a rotation transmission mechanism 10, a clutch mechanism 20, and a casting control mechanism 30.

In the following description, the direction in which a fishing line is unreeled (cast) during fishing is referred to as the front, and the opposite direction is referred to as the rear. Further, left and right refer to left and right when the dual-bearing reel 100 is seen from the rear. Further, the direction of extension of the spool shaft 4 is referred to as the axial direction. The direction orthogonal to the axial direction is referred to as the radial direction.

As shown in FIG. 2, the reel body 2 comprises a frame 6, a first side cover 7, and a second side cover 8. The frame 6 has a first side plate 6a, a second side plate 6b, and a plurality of connecting portions 6c. The first side plate 6a is disposed on the right side of the frame 6. The first side plate 6a has a boss portion 6d. The second side plate 6b is disposed on the left side of the frame 6, separately from the first side plate 6a in the axial direction. The plurality of connecting portions 6c extend in the axial direction and connect the first side plate 6a and the second side plate 6b.

The first side cover 7 covers the right side of the first side plate 6a of the frame 6. The first side cover 7 has a boss portion 7a. The second side cover 8 covers the left side of the second side plate 6b of the frame 6.

The spool 3 is rotatable relative to the reel body 2. The spool 3 is disposed between the first side plate 6a and the second side plate 6b. The spool 3 is rotatably supported by the reel body 2 via the spool shaft 4.

The spool shaft 4 is rotatably supported by the reel body 2. The spool shaft 4 extends inside the reel body 2 in the axial direction. The spool shaft 4 is connected so as to be able to rotate integrally with the spool 3.

The spool shaft 4 has a first end 4a, and a second end 4b on the opposite side of the first end 4a. In the present embodiment, the first end 4a corresponds to the right end of the spool shaft 4, and the second end 4b corresponds to the left end of the spool shaft 4. The second end 4b is rotatably supported by the reel body 2 via a shaft bearing 11 disposed inside the second side cover 8. The first end 4a is rotatably supported by the reel body 2 via a first shaft bearing 44, described further below.

The handle 5 is rotatably supported by the reel body 2. The handle 5 according to the present embodiment is disposed on the right side of the reel body 2.

The rotation transmission mechanism 10 transmits the rotation of the handle 5 to the spool 3. As shown in FIG. 2, the rotation transmission mechanism 10 comprises a drive shaft 13, a drive gear 14, and a pinion gear 15. The drive shaft 13 is connected to the handle 5 so as to be integrally rotatable. The drive shaft 13 can rotate only in the line-winding direction due to a one-way clutch, not shown, which is disposed on the outer perimeter of the drive shaft 13. The drive gear 14 is attached to the drive shaft 13. The rotation of the handle 5 is transmitted to the drive gear 14 via a drag mechanism, not shown, which is disposed inside the first side cover 7.

Figure 3:
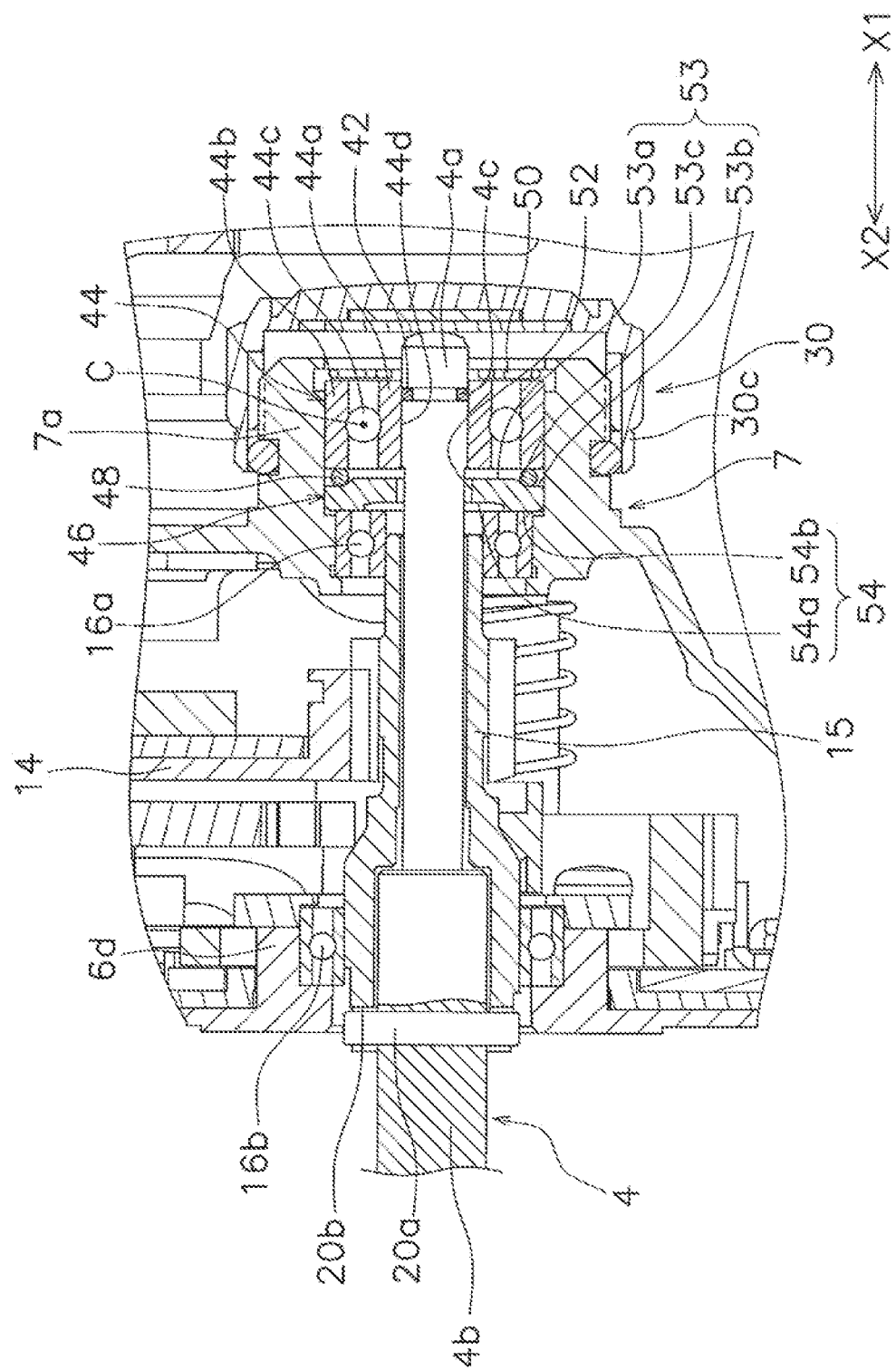
FIG. 3 shows a cross section when the pinion gear is in the coupled position.

As shown in FIG. 3, the pinion gear 15 is a tubular member that extends in the axial direction. The spool shaft 4 extends through the inner circumferential portion of the pinion gear 15. The pinion gear 15 is supported by a shaft bearing 16a (one example of a second shaft bearing) disposed on the boss portion 7a of the first side cover 7, as well as by a shaft bearing 16b disposed on the boss portion 6d of the first side plate 6a, so as to be rotatable about an axis of the spool shaft 4 and to be movable in the axial direction. The pinion gear 15 can be supported by the spool shaft 4.

Figure 4:
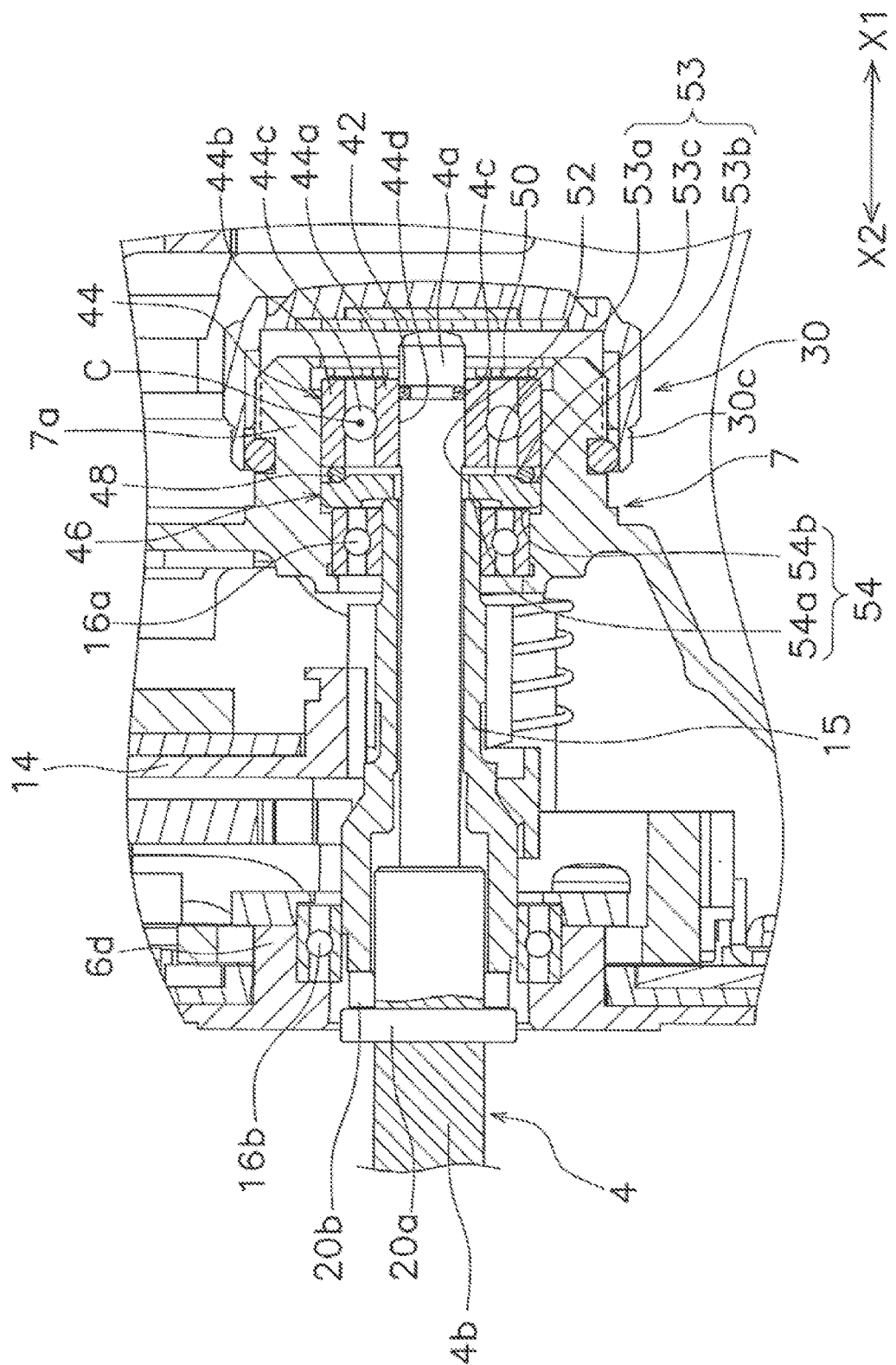
FIG. 4 shows a cross section when the pinion gear is in the decoupled position.

The pinion gear 15 can move, in a first direction X1 approaching the first end 4a of the spool shaft 4 and a second direction X2 opposite the first direction X1, between a coupled position (the position shown in FIG. 3) in which the pinion gear is connected to the spool shaft 4 so as to be integrally rotatable, and a decoupled position (position shown in FIG. 4) in which the connection with the spool shaft 4 is released. The first direction X1 and the second direction X2 are parallel to the axial direction. In the following description, the coupled state denotes that the pinion gear 15 is in the coupled position, and the decoupled state denotes that the pinion gear 15 is in the decoupled position.

The clutch mechanism 20 is a mechanism for transmitting and cutting off the rotational force from the handle 5 to the spool 3. The clutch mechanism 20 has an engagement pin 20a and an engagement recess 20b.

The engagement pin 20a is fixed to the spool shaft 4. The engagement pin 20a extends through the spool shaft 4 in the radial direction such that the two ends project from the spool shaft 4.

The engagement pin 20b engages with the engagement pin 20a in the coupled state. The engagement recess 20b is formed at the end of the pinion gear 15 in the second direction X2. The engagement recess 20b has a shape that is recessed from the second direction X2 toward the first direction X1. A plurality of engagement recesses 20b are formed along the radial direction such that the two ends of the engagement pin 20a engage therewith.

When the clutch mechanism 20 is in the transmitting state, that is, in the coupled state, the engagement pin 20a engages the engagement recess 20b, and the rotational force from the handle 5 is transmitted to the spool 3. When the clutch mechanism 20 is in the cutoff state, that is, in the decoupled state, the engagement pin 20a is disengaged from the engagement recess 20b, and the rotational force of the handle 5 is not transmitted to the spool 3.

As shown in FIGS. 1 and 2, the clutch mechanism 20 is switched between the transmitting state and the cutoff state by a clutch operating member 21 that is disposed in the rear portion of the reel body 2 and a clutch control mechanism 22 that is interconnected with the clutch operating member 21. Because the clutch operating member 21 and the clutch control mechanism 22 have the same configurations as in the prior art, their descriptions have been omitted.

The casting control mechanism 30 presses the spool shaft 4 in the axial direction in order to adjust the braking force that acts on the spool 3. As shown in FIG. 2, the casting control mechanism 30 has a first friction plate 30a, a second friction plate 30b, and a bottomed tubular operating member 30c. The spool shaft 4 is axially interposed between the first friction plate 30a and the second friction plate 30b. The first friction plate 30a is disposed at the bottom of the operating member 30c and contacts the first end 4a and the spool shaft 4. The second friction plate 30b is disposed on the second side cover 8 and contacts the second end 4b of the spool shaft 4. The operating member 30c is rotatably mounted on the outer circumferential surface of a boss portion 7a of the first side cover 7. The first friction plate 30a, together with the operating member 30c, moves in the axial direction in accordance with a turning operation of the operating member 30c. As a result, the pressing force that acts on the spool shaft 4 in the axial direction changes, and the braking force that acts on the spool 3 is adjusted.

The dual bearing reel 100 has a first elastic member 42, the first shaft bearing 44, a pressing member 46, and a second elastic member 48.

The first elastic member 42 is a rubber member that can elastically deform. In the present embodiment, the first elastic member 42 is an O-ring. The first elastic member 42 is mounted on the outer circumferential surface of the spool shaft 4. For example, the first elastic member 42 is mounted in an annular groove 4c formed on the outer circumferential surface of the spool shaft 4. The first elastic member 42 is disposed in a compressed state on the inner peripheral portion of the first shaft bearing 44.

The first shaft bearing 44 rotatably supports the first end 4a of the spool shaft 4. The first shaft bearing 44 is disposed away from the shaft bearing 16a in the first direction X1, in the inner peripheral portion of the boss portion 7a of the first side cover 7. The movement of the first shaft bearing 44 in the first direction X1 is limited by a retaining member 50.

The first shaft bearing 44 has an inner race 44a, an outer race 44b, and a plurality of rolling elements 44c. The inner race 44a has an inner circumferential surface 44d that contacts the first elastic member 42. The first elastic member 42 is pressed by the inner circumferential surface 44d. The inner circumferential surface 44d contacts the outer circumferential surface of the spool shaft 4. The entire first elastic member 42 is disposed inside the inner race 44a. That is, the first shaft bearing 44 does not project from the inner race 44a in the axial direction. The outer race 44b is disposed in contact with the inner circumferential surface of the boss portion 7a. The outer race 44b is disposed so as to be capable of contacting the retaining member 50.

The plurality of rolling elements 44c are arranged so as to be capable of rolling between the inner race 44a and the outer race 44b. The plurality of rolling elements 44c are arranged separately from each other in the circumferential direction by holding members, not shown. The rolling element 44c in the present embodiment is spherical, but may be any other shape, such as columnar. Internal gaps are disposed around the plurality of rolling elements 44c. The first elastic member 42 is disposed on the first direction X1 side of the center C of the plurality of rolling elements 44c in the axial direction. The first elastic member 42 is disposed on the first direction X1 side of the center C of the inner race 44a in the axial direction.

The pressing member 46 is an essentially ring-shaped member, and is disposed away from the spool shaft 4 in the radial direction around the axis of the spool shaft 4. The pressing member 46 is disposed on the inner peripheral portion of the boss portion 7a. The outer circumferential surface of the pressing member 46 is in contact with the inner circumferential surface of the boss portion 7a. The pressing member 46 is disposed between the first shaft bearing 44 and the shaft bearing 16a. The pressing member 46 is disposed between the shaft bearing 16a and the second elastic member 48. The pressing member 46 is pressed in the first direction X1 by the pinion gear 15 in the decoupled state. The pressing member 46 is separated from the shaft bearing 16a in the decoupled state. The pressing of the pressing member 46 in the first direction X1 by the pinion gear 15 is released in the coupled state. In the present embodiment, the pressing member 46 is separated from the pinion gear 15 and is in contact with the shaft bearing 16a in the coupled state.

The pressing member 46 has a through-hole 52, a first side surface 53, and a second side surface 54. The through-hole 52 is a hole through which the spool shaft 4 is passed, and is formed penetrating in the axial direction. The through-hole 52 is formed in the center of the pressing member 46. The diameter of the through-hole 52 can be smaller than the outer diameter of the pinion gear 15.

The first side surface 53 opposes the first shaft bearing 44 in the axial direction. The first side surface 53 is separated from the first shaft bearing 44 in the axial direction. The first side surface 53 includes an inside surface 53a, an outside surface 53b, and an inclined surface 53c.

The inside surface 53a and the outside surface 53b extend radially. The inside surface 53a is closer to the first shaft bearing 44 than the outside surface 53b in the axial direction. The outside surface 53b is located radially outwardly from the inside surface 53a. The outside surface 53b opposes the outer race 44b of the first shaft bearing 44 in the axial direction. The inclined surface 53c is disposed between the inside surface 53a and the outside surface 53b and connects the inside surface 53a and the outside surface 53b. The inclined surface 53c is inclined with respect to the inside surface 53a and the outside surface 53b. The inclined surface 53c is inclined in a direction away from the first shaft bearing 44 from the inside surface 53a toward the outside surface 53b. At least a portion of the inclined surface 53c opposes the outer race 44b of the first shaft bearing 44 in the axial direction.

The second side surface 54 opposes the shaft bearing 16a in the axial direction. The second side surface 54 includes an inside surface 54a, and an outside surface 54b. The inside surface 53a and the outside surface 53b extend in the radial direction.

The inside surface 54a opposes the inner race of the shaft bearing 16a and the pinion gear 15 in the axial direction. The inside surface 54a is farther from the shaft bearing 16a than the outside surface 54b in the axial direction. A step is disposed between the inside surface 54a and the outside surface 54b in the axial direction. The inside surface 54a is separated from the inner race of the shaft bearing 16a in the axial direction in the coupled state and the decoupled state. The inside surface 54a is separated from the pinion gear 15 in the coupled state. The inside surface 54a contacts the pinion gear 15, and is pressed in the first direction X1 in the decoupled state.

The outside surface 54b is disposed radially outwardly from the inner race of the shaft bearing 16a and the inside surface 54a. The outside surface 54b opposes the outer race of the shaft bearing 16a in the axial direction. The outside surface 54b contacts the outer race of the shaft bearing 16a in the coupled state and is separated from the outer race of the shaft bearing 16a in the decoupled state.

The second elastic member 48 is a rubber member that can elastically deform. In the present embodiment, the second elastic member 48 is an O-ring. The second elastic member 48 is disposed between the pressing member 46 and the outer race 44b of the first shaft bearing 44. The second elastic member 48 contacts the outside surface 53b and the inclined surface 53c of the first side surface 53 of the pressing member 46. The second elastic member 48 contacts the side surface of the outer race 44b that faces the second direction X2. The inner diameter of the second elastic member 48 is preferably larger than the outer diameter of the inside surface 53a of the first side surface 53.

The pressing member 46 is pressed by the pinion gear 15 when the pinion gear is in the decoupled state; thus, the second elastic member 48 presses the outer race 44b of the first shaft bearing 44 in the first direction X1. Preferably, the second elastic member 48 is not compressed in the axial direction in the coupled state. That is, preferably, the second elastic member 48 is not pressed in the axial direction by the first shaft bearing 44 and the pressing member 46 in the coupled state.

In the present embodiment, the pressing member 46 and the second elastic member 48 also function as spacers that fill the gap between the shaft bearing 16a and the first shaft bearing 44 in the axial direction. That is, the pressing member 46 and the second elastic member 48 limit the movement of the shaft bearing 16a and the first shaft bearing 44 in the axial direction.

In the dual-bearing reel 100 configured as described above, the outer race 44b of the first shaft bearing 44 is pressed in the first direction X1 by the pinion gear 15 via the pressing member 46 and the second elastic member 48 when the pinion gear 15 is in the decoupled position. Further, the first elastic member 42 is in contact with the outer circumferential surface of the spool shaft 4 and the inner circumferential surface of the inner race 44a of the first shaft bearing 44. Therefore, when the outer race 44b of the first shaft bearing 44 is pressed by the pinion gear 15 in the first direction X1 via the pressing member 46 and the second elastic member 48, the outer race 44b of the first shaft bearing 44 moves in the axial direction relative to the inner race 44a of the first shaft bearing 44. Thus, when the pinion gear 15 is in the decoupled position, the internal gap of the first shaft bearing 44 in the axial direction is reduced. It is therefore possible to suppress the generation of vibrations and knocking noises in the first shaft bearing 44 that supports the spool shaft 4 at the time of casting. In addition, loosening of the inner race 44a of the first shaft bearing 44 in the axial direction can be suppressed with the first elastic member 42.

Other Embodiments

One embodiment of the present invention was described above, but the present invention is not limited to the above-described embodiment, and various modifications can be made without departing from the scope of the invention. Specifically, the various embodiments and modified examples described in the present Specification can be combined in any manner as deemed necessary.

In the present embodiment, the pressing member 46 contacts the shaft bearing 16a in the coupled state, but can be separated from the shaft bearing 16a in the coupled state.

In the present embodiment, the inclined surface 53c is formed on the first side surface 53 of the pressing member 46, but the inclined surface 53c can be a flat surface that extends parallel to the axial direction. Alternatively, a groove or a projection for holding the second elastic member 48 can be formed on the outside surface 53b of the first side surface 53 of the pressing member 46.

What is claimed is:

1. A dual-bearing reel, comprising:
a reel body;
a spool shaft having a first end and a second end opposite the first end, and being rotatably supported by the reel body;
a first elastic member mounted on an outer circumferential surface of the spool shaft;
a first shaft bearing having an inner race that has an inner circumferential surface configured to contact the first elastic member, an outer race, and a plurality of rolling elements disposed between the inner race and the outer race, the first shaft bearing disposed in the reel body, and rotatably supporting the first end of the spool shaft;
a pinion gear configured to move in a first direction toward the first end of the spool shaft and a second direction opposite of the first direction, between a coupled position in which the pinion gear is connected to the spool shaft so as to be integrally rotatable, and a decoupled position in which the connection with the spool shaft is released;
a pressing member configured to pressed in the first direction by the pinion gear when the pinion gear is in the decoupled position; and
a second elastic member disposed between the pressing member and the outer race of the first shaft bearing, and the pressing member configured to be pressed by the pinion gear when the pinion gear is in the decoupled position, thereby pressing the outer race of the first shaft bearing in the first direction.

2. The dual-bearing reel according to claim 1, wherein the pressing member pressed in the first direction by the pinion gear is released when the pinion gear is in the coupled position.

3. The dual-bearing reel according to claim 1, further comprising
a second shaft bearing disposed in the reel body and being rotatably supported by the pinion gear,
the pressing member being disposed between the first shaft bearing and the second shaft bearing, being configured to contact the second shaft bearing when the pinion gear is in the coupled position, and being separated from the second shaft bearing when the pinion gear is in the decoupled position.

4. The dual-bearing reel according to claim 1, wherein the first elastic member is disposed on a first direction side of a center of the plurality of rolling elements in an axial direction of the spool shaft.

5. The dual-bearing reel according to claim 1, wherein the first elastic member and the second elastic member are O-rings.

* * * * *